Sept. 18, 1956  F. W. SEYBOLD  2,763,163
AUTOMATIC TRANSMISSION
Filed March 15, 1954  3 Sheets-Sheet 1

INVENTOR.
Frederick W. Seybold

Sept. 18, 1956 F. W. SEYBOLD 2,763,163
AUTOMATIC TRANSMISSION
Filed March 15, 1954 3 Sheets-Sheet 3
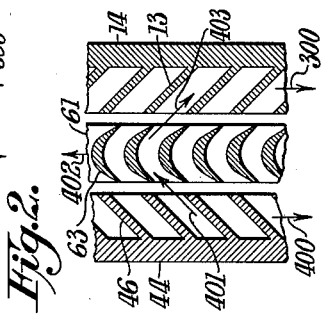
Fig. 2.
Fig. 3.
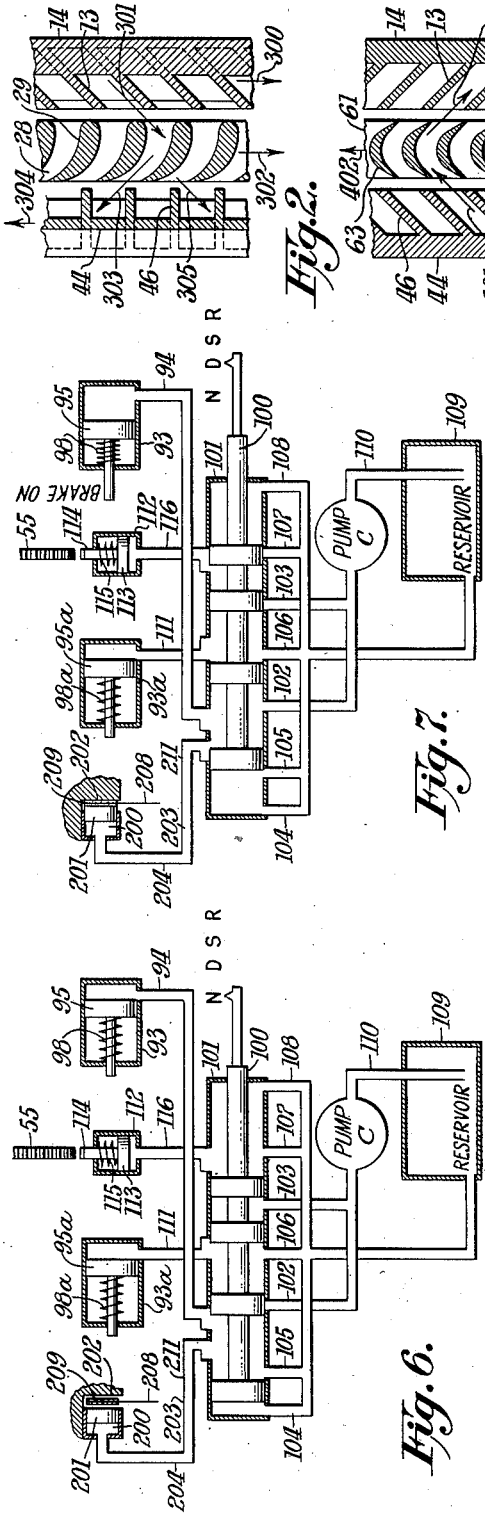
Fig. 7.
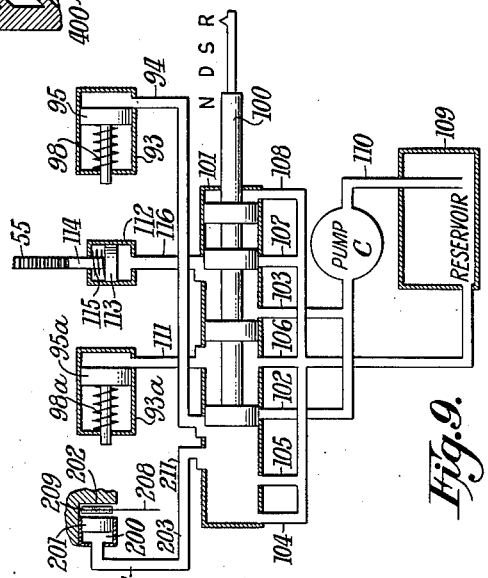
Fig. 9.
Fig. 6.
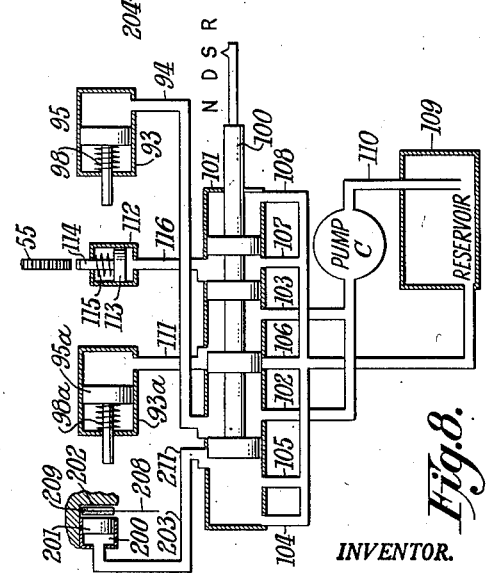
Fig. 8.
INVENTOR.
Frederick W. Seybold

United States Patent Office 2,763,163
Patented Sept. 18, 1956

2,763,163

AUTOMATIC TRANSMISSION

Frederick W. Seybold, New Rochelle, N. Y.

Application March 15, 1954, Serial No. 416,091

20 Claims. (Cl. 74—677)

This invention relates to automatic power transmitting devices, particularly to those adapted for use with internal combustion engines or other applications that require variable speed and torque ratios.

Such devices as are referred to above are adapted for mounting between the power plant and the driven shaft of automotive vehicles such as passenger cars, buses, trucks, and military tanks and for other power transmission applications requiring multiplied torque for starting such vehicles from rest and thereafter bringing them into a direct driving ratio.

In particular, variable speed and torque transmitting devices of this nature, namely, the combination of a fluid drive unit and a geared drive unit arranged in tandem have become more or less standard equipment on passenger automobiles.

Previous combinations of this nature have employed governor controlled clutches and brakes, their coupling and release sometimes being in overlapping relationship which requires precise timing in order to avoid a perceptible shock when passing from one speed ratio into another.

The control system necessary for the actuation of these clutches and brakes is not only complicated and therefore expensive, but is also subject to wear and failure and to becoming out of adjustment.

Having the foregoing in mind, it is a primary object of the present invention to provide the combination of a multiple turbine torque converter and a geared unit in a transmision characterized by extreme simplicity and smoothness of operation.

A further object of this invention is to provide an automatic variable speed transmission with means to initiate the drive under a high starting torque condition and with means to progressively reduce the output torque and pass smoothly into the direct drive condition without benefit of auxiliary control elements, such as a centrifugal governor, or a solenoid, or by throttle manipulation.

A still further object of this invention is to provide a torque and speed controlled transmisson which is inherently capable to adapt itself to the required torque ratio.

Another object of this invention is to provide means for maintaining the transmission in an underdrive ratio and overrule its capacity to pass into the direct drive ratio.

This invention also includes the feature of utilizing the same gears for reverse operation and the provision of a hill-holding device which becomes automatically ineffective when the transmission is conditioned for reverse operation.

The above objects and advantages will become apparent when reference is made to the following description taken in connection with the accompanying drawings, in which:

Figure 2 is a cross-sectional view of the second turbine member, the first turbine member and the pump, showing the shape of the blades taken along line 2—2 of Figure 1;

Figure 3 is a cross-sectional view of the second turbine member, the stator and the pump, showing the shape of the blades taken along line 3—3 of Figure 1;

Figure 6 is a diagrammatic view showing the hydraulic control system for the several brakes and optional clutch with the control valve set in the "neutral" position;

Figure 7 is a diagrammatic view showing the hydraulic control valve set in the "drive" position;

Figure 8 is a diagrammatic view showing the hydraulic control valve set in the "second gear" position; and Figure 9 is a diagrammatic view showing the hydraulic control valve set in the "reverse" position.

GENERAL ARRANGEMENT

Figure 1:
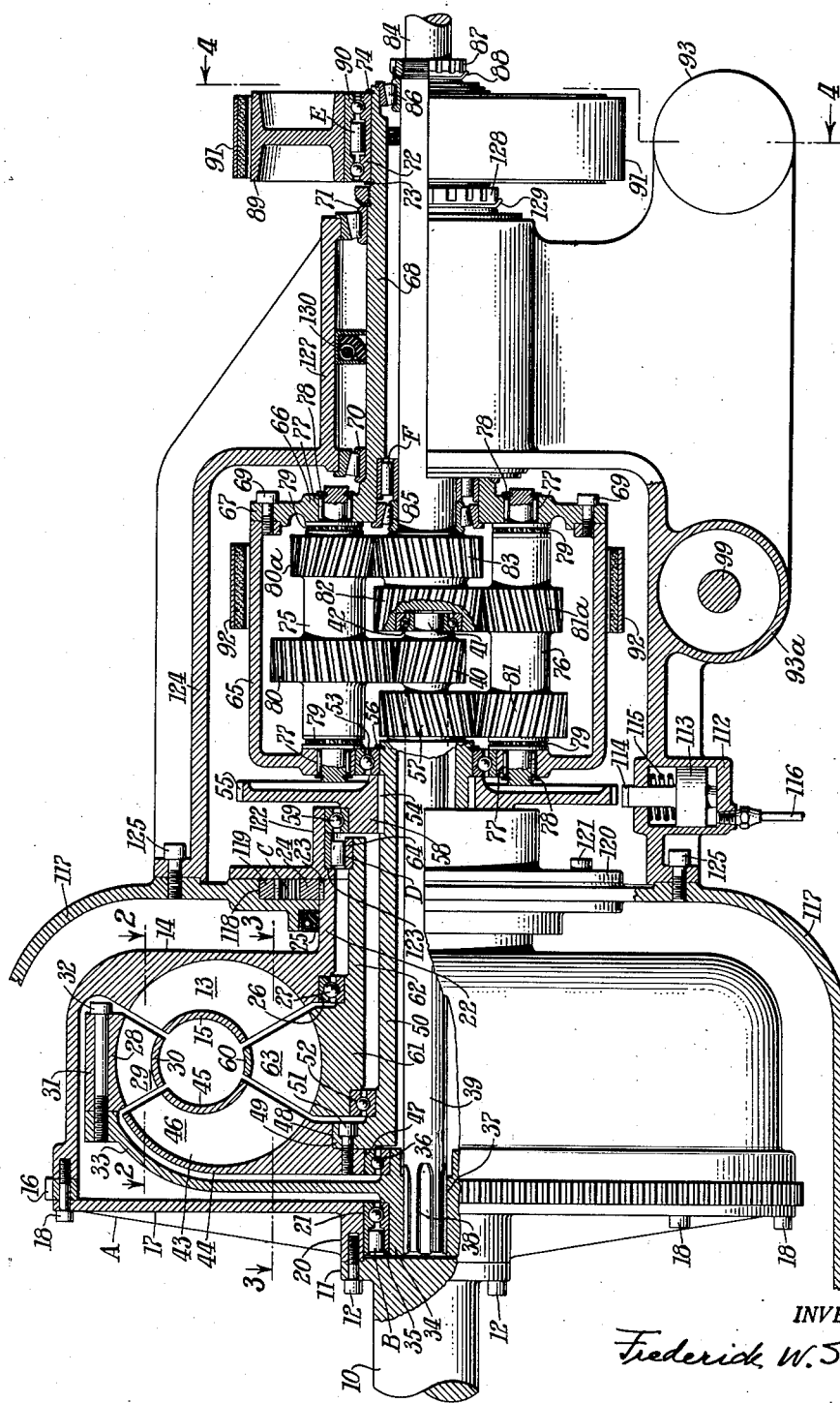
Figure 1 is a vertical, longitudinal section through a power transmission constructed according to my invention.

In general this transmission comprises the combination of a multiple turbine torque converter and an interconnected planetary gearing arrangement controlled by brakes, whereby a high starting torque is provided for the rapid acceleration of a motor vehicle from standstill in either direction of motion. The transmission is also capable through its own progressive action to produce a continuously decreasing torque and speed ratio and to finally pass into a direct drive ratio without the interaction of the clutches and/or brakes controlled by a governor or other devices.

The converter comprises a pump member driven by the engine. The fluid discharged from the pump enters a first turbine member which is connected to a sun driving pinion. The fluid discharged from the first turbine member impinges on the blades of a second turbine member which is connected to another sun driving pinion.

The fluid discharged from the second turbine member enters the blades of the stator element whose blades are shaped so that the fluid discharged from the stator enters the blades of the pump with a minimum of shock. The stator is operatively connected to a one-way brake which prevents its backward rotation while permitting it to rotate in the forward direction.

The planetary gearing arrangement comprises further a frame which is mounted for co-axial rotation with the driving and driven shafts of the transmission and paired sets of cluster pinions are rotatably mounted on this frame and certain of said pinions mesh with the sun driving pinions previously mentioned, while others mesh with a double sun pinion which is integral with the driven or output shaft.

The frame is further provided with an overrunning clutch and brake device whereby backward rotation of the frame is prevented when the brake device is operative, however permitting forward rotation of the frame when a forward torque is imposed thereon. An additional brake which may be applied directly to the frame is also provided for hill braking of the vehicle as well as for a "pick-up" ratio for passing or accelerating in traffic.

Reverse operation of the transmission is provided by the application of a hydraulically actuated pawl to a toothed wheel which is integral with the second turbine member previously mentioned, the other brake devices then being in their released condition.

Another overrunning clutch is interposed between the first turbine member and the drive shaft whereby the first turbine element cannot rotate faster than the drive shaft and this overrunning clutch compels the frame to rotate forwardly as the speed of the second turbine exceeds a definite ratio and when its speed eventually approaches that of the first turbine and the drive shaft a direct ratio drive will be brought about.

In another form of the proposed arrangement the outer member of the overrunning clutch between the first turbine member and the drive shaft is disconnectible from the drive shaft, and when so disconnected the output shaft will then continue to run in an underdrive speed ratio, i. e. a "pick-up" speed ratio is thereby obtained.

The speed ratio between the first and second turbine members is, of course, determined by the gear proportions of the planetary gearing arrangement. The second turbine member rotates at less than half the speed of the first turbine member at starting. Upon acceleration of the engine the fluid pumped by the impeller is thrown against the still stationary blades of the first turbine member producing a forward thrust which is transmitted to its sun driving pinion. The discharged fluid from the first turbine member is thrown against the blades of the second turbine member producing a backward thrust which is transmitted to its sun driving pinion. The frame being held from rotating backwardly by the brake device will, therefore, serve as the reaction member and a greatly multiplied net torque will be impressed on the output shaft at stall.

As the vehicle gains in speed the speed of rotation of the first turbine member will aproach that of the drive shaft and all the fluid torque will thereafter be delivered by the second turbine member to its sun driving pinion, the fluid discharged from the first turbine member having attained a more and more favorable entrance angle into the second turbine member as the first turbine member increases its speed relative to the pump.

A further rise in engine and vehicle speed will bring about the condition whereby the first turbine member attains the speed of the drive shaft but cannot exceed it, being prevented from doing so by the previously mentioned overrunning clutch. All the engine driving torque is then multiplied in the converter only, the frame now will begin to rotate forwardly and a portion of the torque delivered to the sun driving pinion of the second turbine member will be "fed back" through the sun driving pinion of the first turbine member to the drive shaft to augment the engine torque.

The speed of the second turbine member will eventually approach that of the first turbine member and so will the stator of the converter, the frame and the output shaft, so that a substantially direct drive ratio is achieved.

The amount of "feed-back" torque is comparatively small, being approximately 15% of the engine torque in the direct drive ratio and about 26% of the engine torque at the instant when the frame begins to rotate forwardly in the construction about to be described in detail.

It is also to be noted that only one control member need be applied to a member of the gearing arrangement to provide high torque multiplication for accelerating the vehicle from rest and through the progressive interaction of the elements of the fluid torque converter and the gears a substantially direct drive ratio will be established without a change in the setting of said control member.

STRUCTURAL ARRANGEMENT

Figures 4, 5:
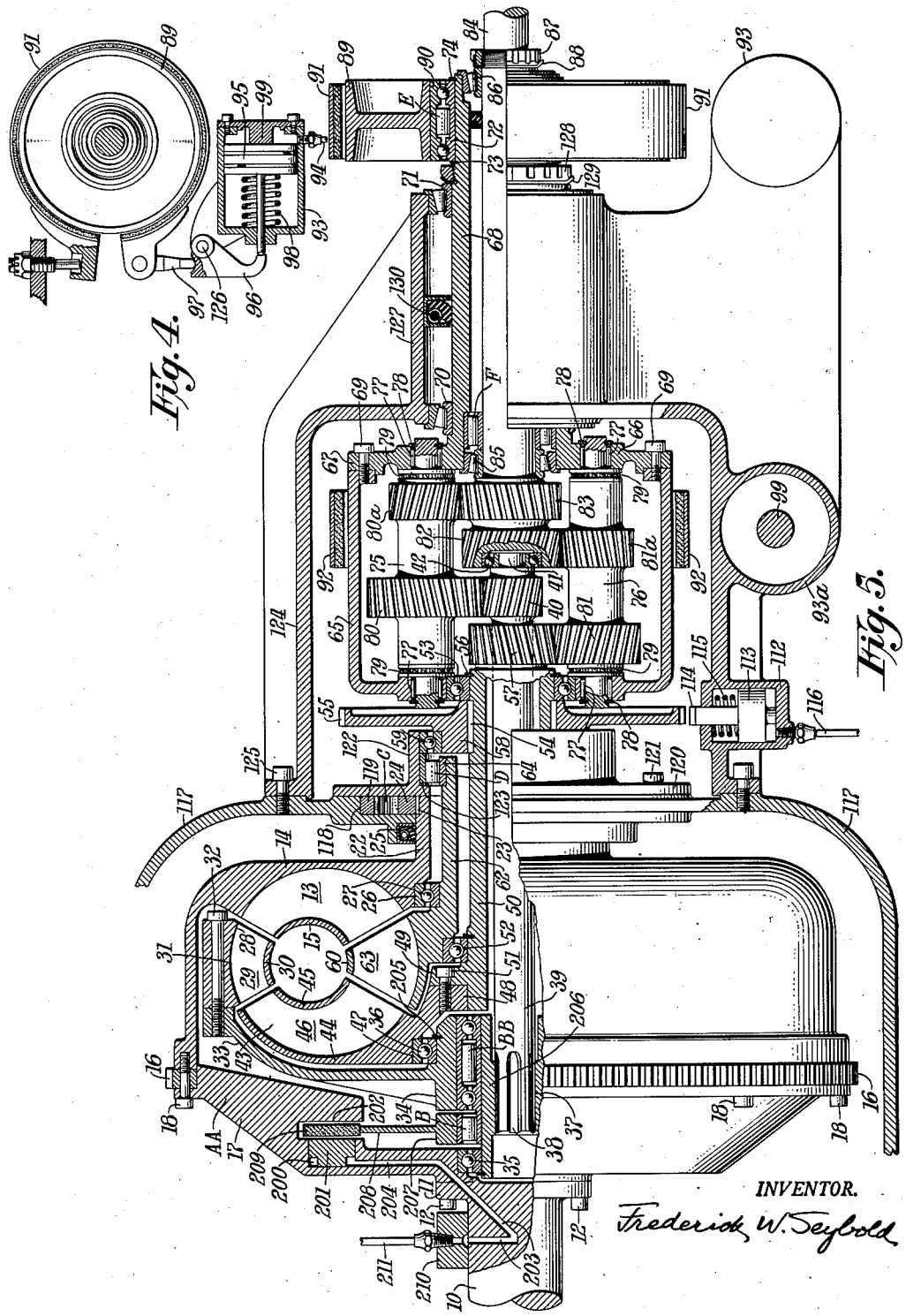
Figure 4 is a transverse sectional view of one of the brake devices taken along line 4—4 of Figure 1.
Figure 5 is a vertical, longitudinal section through a modified form of the power transmission.

The two transmissions illustrated in Figures 1 and 5 may best be understood by dividing each of them into eight assemblies. The construction shown in Figure 5 differs from the construction of Figure 1 in respect to only three of the assemblies and these assemblies will be described in detail after the eight assemblies of Figure 1 have been completely described.

Structural arrangement of Figure 1

1. THE DRIVING ASSEMBLY

The driving assembly comprises the drive shaft 10 which is provided with a flange 11 for mounting a hydrokinetic torque converter A by means of the screws 12. Curved blades 13 are equally spaced between the outer toroidal shell 14 and the inner toroidal shell 15, forming the pump or impeller of the torque converter A. The engine starter gear 16 is interposed between the outer shell 14 and the rear wall 17 of the converter housing and they are fastened together by means of screws 18.

A hub 20 is provided on the rear wall 17 for the reception of the screws 12 and the outer member 21 of an overrunning clutch and ball bearing B. The outer shell 14 is also provided with a hub 22 and splines 23 thereon to which one of the pump gears 24 of a gear pump C is connected. On the hub 22 is further provided a smooth surface to accommodate the oil seal 25 and a bore 26 for receiving the outer race of ball bearing 27.

2. THE FIRST TURBINE ASSEMBLY

The first turbine assembly consists of the turbine 28 composed of the curved blades 29 and the inner toroidal shell 30 and the outer toroidal shell 31. Turbine 28 is secured by means of the screws 32 to the shell member 33. Member 33 is provided with a hub 34 for receiving on its outer diameter the inner member 35 of the overrunning clutch and ball bearing B, as well as the inner race of the ball bearing 36. The hub 34 is provided at its inner diameter or bore with multiple internal splines 37 into which are fitted the multiple external splines 38 of the long pinion shaft 39.

Helical teeth 40 are provided on shaft 39 and a reduced portion 41 thereon carries the inner race of ball bearing 42.

3. THE SECOND TURBINE ASSEMBLY

The second turbine assembly comprises the turbine 43 composed of the outer toroidal shell 44 and the inner toroidal shell 45 between which the curved blades 46 are equally spaced and secured. The shell 44 is provided with a bore 47 for the seating of the outer race of ball bearing 36 and a recess 48 for supporting the flange portion 49 of the long, hollow sleeve 50.

Screws 51 secure the sleeve 50 to the shell 44. Sleeve 50 also provides a seat for the inner races of ball bearings 52 and 53, and it is splined on one end at 54 for securing thereto the toothed disc 55. A retaining ring 56 secures the location of the disc 55 and ball bearing 53 on the sleeve 50. Helical teeth 57 are also provided on sleeve 50. The disc 55 also has a hub 58 on which the inner race of the ball bearing 59 is mounted.

4. THE STATOR ASSEMBLY

The stator assembly consists of the inner toroidal shell 60 and the outer toroidal shell 61 which extends into a long, hollow sleeve 62. Curved blades 63 are equally spaced and secured between the shells 60 and 61.

The inner member 64 of a one-way brake D and the inner race of ball bearing 27 are supported on the sleeve 62 and on shell 61 a recess is provided for the outer race of the ball bearing 52.

5. THE REACTION ASSEMBLY

The reaction assembly comprises the hollow cylindrical frame 65 which is provided with a bore into which fits the outer race of the ball bearing 53. A member 66, which comprises the circular flange portion 67 and the long hub 68, is secured by means of screws 69 to the frame 65, thereby forming an enclosure for the planetary gear arrangement.

The inner races of opposed tapered roller bearings 70 and 71 are mounted on the long hub 68 as well as the inner member 72 of a combination overrunning clutch and ball bearing E, the latter being held in position by the retaining rings 73 and 74.

Cluster pinions 75 and 76 are rotatably mounted in the frame 65 on needle bearings 77 and held in position by the retaining rings 78. Thrust bearings 79 are also provided at each end of the cluster pinions. There are preferably three each of the cluster pinions 75 and 76 in the gear arrangement, the pinion 40 meshing only with pinions 80 of cluster pinions 75, while pinion 57 meshes only with pinions 81 of the cluster pinions 76.

6. THE DRIVEN ASSEMBLY

The driven assembly comprises the double sun gear 82 and 83 integral with the output or driven shaft 84. Pinions 80a of the cluster pinions 75 mesh with sun gear 83, while pinions 81a of the cluster pinions 76 mesh with sun gear 82. Shaft 84 is journalled at opposite ends on opposed tapered roller bearings 85 and 86 respectively, their inner races being secured to shaft 84, while their outer races are fitted into the long hub 68. A locknut 87 and a lockwasher 88 are provided to adjust or take up wear of bearings 85 and 86.

An overrunning clutch F is interposed between the driven shaft 84 and the hub 68 of the reaction assembly, whereby reverse rotation of the driven shaft 84 is prevented as long as the reaction assembly is braked.

7. THE CONTROL ASSEMBLY

The control assembly comprises the brake wheel 89 into the bore of which is fitted the outer member 90 of the combination overrunning clutch and ball bearing E.

Brake bands 91 and 92 are respectively cooperating with the brake wheel 89 and the frame 65 when pressure fluid enters cylinders 93 and 93a through the conduits 94 and 111 respectively, and forcing pistons 95 and 95a to the left (see Figure 4) and actuating lever 96 on pin 97, thereby contracting the band 91 around the brake wheel 89.

When the oil pressure is released spring 98 will push piston 95 to the right against abutment 99 and brake band 91 will release brake wheel 89.

The flow of pressure oil is controlled by the manually operated piston valve 100 which is shiftably mounted in the valve body 101, see Figure 6. Oil is supplied to gear pump C from the reservoir 109 through the conduit 110 and the gear pump C delivers pressure oil through conduits 102 and 103 to the valve body 101. Drain lines 104, 105, 106, 107 and 108 from the valve body 101 to the reservoir 109 are also provided.

Conduits 94 and 111 lead from the valve body 101 to each of the brake cylinders 93 and 93a respectively. Another cylinder 112 is provided, having a piston 113 and a pawl 114 thereon. The pawl 114 will be forced into engagement with the teeth of the disc 55 when pressure oil enters cylinder 112 through the conduit 116. A spring 115 will return the pawl 114 and piston 113 to their retracted position when the oil pressure is released.

8. CASING AND GEAR PUMP ASSEMBLY

The casing in which the complete transmission is housed consists of several sections. The section 117 conforms to the general shape of the fluid torque converter and it is bolted to the engine crank case (not shown).

Section 117 is provided with a recess 118 in which the gear pump C composed of the internal gear 119 meshing with the previously mentioned pump gear 24 is installed. A pump cover plate 120 is secured to the casing 117 by means of the screws 121, and a hub 122 provides internally a support for the outer member 123 of the overrunning clutch D and also for the outer race of the ball bearing 59.

Gear pump C delivers pressure oil to the valve body 101 and with the setting of the piston valve 100 certain brake bands, pawl or optional clutch are activated.

Casing 124 is cylindrical in shape and it is fastened to casing 117 by means of the screws 125. In the casing 124 are incorporated the cylinders 93 and 93a, also the cylinder 112, as well as the pivot pins 126 of the levers 96, see Figure 4.

The outer races of the tapered roller bearings 70 and 71 are fitted into a contracted section 127 of the casing 124 and a lock nut 128 and a lock washer 129 are provided on the long hub 68 for adjusting or taking up wear of the roller bearings 70 and 71.

An oil seal 130 prevents leakage of oil from the casing 124.

Structural arrangement of Figure 5

The modification of the invention as shown in Figure 5 differs from the structure just described only in the construction of the driving assembly, the first turbine assembly and an additional element to the control assembly.

This construction provides for the selective release and re-connection of the outer member of the overrunning clutch B of Figure 1, and in addition it provides for another overrunning clutch interposed between the first turbine member and its cooperating sun driving pinion and suitable control means therefor.

A description only of the driving assembly, the first turbine assembly and the additional fluid control member and circuit is, therefore, necessary for the complete understanding of the transmission shown in Figure 5.

Assemblies 3, 4, 5, 6 and 8 being identical, the same reference numerals will apply to corresponding parts of both structures, while the unique parts to be found only in Figure 5 will be designated by numerals beginning with 200.

1a. THE DRIVING ASSEMBLY

The driving assembly comprises the drive shaft 10 which is provided with a flange 11 for mounting a hydrokinetic torque converter AA by means of the screws 12. Curved blades 13 are equally spaced between the outer shell 14 and the inner shell 15 forming the pump or impeller of the torque converter AA. The engine starter gear 16 is interposed between the outer shell 14 and the rear wall 17 of the converter housing and they are fastened together by means of the screws 18.

The rear wall 17 is provided with a cylindrical cavity 200 for the reception of the ring piston 201. Opposite the cavity 200 is a flat, circular surface 202. The drive shaft 10 and the rear wall 17 are provided with the conduits 203 and 204 respectively, whereby pressure oil is conducted to the cavity 200.

The outer shell 14 is also provided with a hub 22 and splines 23 thereon to which one of the pump gears 24 of a gear pump C is connected. On the hub 22 is further provided a smooth surface to accommodate the oil seal 25 and a bore 26 for receiving the outer race of the ball bearing 27.

2a. THE FIRST TURBINE ASSEMBLY

The first turbine assembly consists of the turbine 28 composed of the curved blades 29 and the inner toroidal shell 30 and the outer toroidal shell 31. Turbine 28 is secured by means of the screws 32 to the shell member 33. Member 33 is provided with a hub 34 for receiving in its bore the outer member of a combination ball bearing and overrunning clutch BB.

The inner race of ball bearing 36 is held in place on the outer diameter of the hub 34 by means of the retaining ring 205. On a sleeve 206 the inner member of the combination ball bearing and overrunning clutch BB is mounted and in addition the inner member 35 of the ball bearing and overrunning clutch B is also secured thereto. Sleeve 206 is provided at its inner diameter with the multiple internal splines 37 into which are fitted the multiple external splines 38 of the long pinion shaft 39. Helical teeth 40 are provided on shaft 39 and a reduced portion 41 thereon carries the inner race of the ball bearing 42.

The outer member of the overrunning clutch B is secured to a hub 207 to which the flexible clutch disc 208 with friction surfaces 209 is fastened. Friction surfaces 209 are interposed between the ring piston 201 and the circular surface 202 and thereby form a clutch unit.

3a. THE CONTROL ASSEMBLY

To provide for the additional control required for the clutch unit comprising the members 201, 202, 208 and 209 shown in the construction of Figure 5, a conduit 211 for conducting pressure oil leads from the valve body 101 to the bearing 210 of the engine crank shaft 10, see Figures 5 to 9 inclusive, where the oil may enter conduits 203 and 204 previously mentioned and force ring piston 201 into engagement with the friction surfaces 209 and circular surface 202, thereby locking member 207—208 to the driving assembly.

OPERATION

A. Idling or "neutral" operation

When the vehicle brakes are applied with the engine idling and all control devices of the transmission in their released setting, as shown in Figure 6, the driven shaft 84 remains stationary. For the purpose of illustrating the design of a transmission embodying this invention the following gear proportions have been chosen:

FIRST TURBINE GEAR SET

|  | Teeth |
|---|---|
| Sun pinion 40 | 15 |
| Planet pinion 80 | 30 |
| Planet pinion 80a | 18 |
| Sun gear 83 | 27 |

SECOND TURBINE GEAR SET

|  | Teeth |
|---|---|
| Sun pinion 57 | 27 |
| Planet pinion 81 | 27 |
| Planet pinion 81a | 24 |
| Sun gear 82 | 30 |

For one revolution of the drive shaft 10 or pump 13—14—15 the various assemblies make:

|  | Revolutions |
|---|---|
| 1. Driving assembly | +1 |
| 2. First turbine assembly | +1 |
| 3. Second turbine assembly | +⅛ |
| 4. Stator assembly | 0 |
| 5. Reaction assembly | −½ |
| 6. Driven assembly | 0 |

B. Forward drive operation

With the foot brake applied the transmission control valve 100 is shifted from the "neutral" position into the "drive" position as shown in Figure 7, whereby the piston 95 becomes energized and as a result the brake band 91 will be applied to the brake wheel 89, and thereby the backward rotation of the frame 65 and the forward rotation of the first and second turbine assemblies will cease.

In the construction of Figure 5 the ring piston 201 will also become energized, whereby the friction surfaces 209 will be clutched to the drive shaft 10. Upon release of the foot brake and an acceleration of the engine its torque will be multiplied by the action of the fluid in the converter against the blades of the turbines and stator and also by the reaction assembly of the gear arrangement.

If in Figure 3 the arrow 300 indicates the direction of rotation of the pump 13—14—15, the arrow 301 shows the direction in which the discharged fluid enters the first turbine 28—29 and there it creates a forward thrust thereon, indicated by arrow 302. Arrow 303 shows the direction of the fluid as it leaves the blades 29 and enters the second turbine 44—46, where it produces a backward thrust on the second turbine assembly indicated by the arrow 304, but augments the forward thrust on the first turbine member 28—29. For example, if the engine torque is represented by 100 units the forward thrust at stall may be 200 units, while the backward thrust on the second turbine member is then 100 units.

The torque multiplication in the first turbine gear set is $30/15 \times 27/18 = 3$ times the torque applied to the sun driving pinion 40, so that when 200 units of torque are applied at pinion 40 the output sun gear 83 will therefore, receive 600 units of forward torque.

The torque multiplication in the second turbine gear set is $27/27 \times 30/24 = 5/4$ times the torque applied to the sun driving pinion 57, so that when −100 units (backward thrust) are applied to the sun driving pinion 57 the output sun gear 82 will, therefore, receive −125 units of backward torque. The net forward torque at stall on the driven shaft 84 is then 600−125 or 475 units, i. e. just at the beginning of motion of the vehicle.

The speed ratio between the first and second turbine asemblies is determined by the gear proportions, and according to the data given above, the second turbine makes $15/30 \times 18/27 \times 30/24 \times 27/27 = 5/12$ or .4166 revolution for one revolution of the first turbine assembly.

The speed of both turbines continues to rise with a further increase in engine speed, but the speed ratio between the turbines will be maintained until the speed of the first turbine equals the pump speed. As the speed of the first turbine relative to the pump increases the direction of fluid entrance into the second turbine becomes more and more favorable and at a certain stage it will have an entrance direction as shown by arrow 305, whereby a forward thrust on the second turbine member is produced, while the forward thrust of the first turbine gradually decreases.

If in Figure 4 the arrow 400 indicates the direction of rotation of the second turbine member 44—46, the arrow 401 shows the direction in which the discharged fluid enters the stator 61—63 and there it creates a backward thrust thereon, indicated by arrow 402. Arrow 403 shows the direction of the fluid as it leaves the blades 63 of the stator and enters the pump 13—14—15, but it augments the forward thrust of the second turbine 44—46.

When the condition is reached where the speed of the first turbine member equals that of the pump the transmission of torque from the pump to the first turbine member will cease. The overrunning clutch "B" will prevent the first turbine member from turning faster than the pump. All of the engine torque will then be delivered to the second turbine member and it will be further augmented by the stator in an amount depending on the speed ratio then prevailing between the second turbine member and the pump.

At the above indicated speed ratio of .4166 the torque multiplication ratio in the fluid torque converter may be 1.65, hence the torque received by the driven shaft 84 will be $5/4 \times 1.65 = 2.0625$ times the engine torque, and the driven shaft speed will be ⅓ that of the driving shaft 10, and the efficiency of the transmission will then be 68.75%.

This is the condition prevailing just prior to the transition point, i. e. the beginning of the forward rotation of the frame 65 of the reaction member of the gear arrangement.

The torque pattern for the gear arrangement having the data as given above is as follows:

| Pinions 80—80a | −2 | +8 | Pinion 57 |
| Sun gear 83 | −3 | +10 | Sun gear 82 |
| Pinion 40 | +1 | −2 | Pinion 81—81a |

The net output torque of the driven shaft 84 is $+10-3=7$ units. The gross input torque is 8 units impressed on pinion 57, while 1 unit of torque is fed back to the drive shaft 10, where 7 units of engine torque are supplied which must be the same as the net output torque. The reaction torque in each gear set must be the same for balance and is here equal to −2 units.

The feed-back torque as indicated by the torque pattern is ⅛ of the gross input torque. When the torque multiplication ratio in the converter is 1.65 the gross input torque T is computed as follows:

$$T = 1.65(100 + T/8)$$
$$= 165 + .206T$$
$$= 165/.794$$
$$= 208 \text{ units}$$

The torque pattern is then:

| Pinions 80—80a | −52  | +208 | Pinion 57   |
|----------------|------|------|-------------|
| Sun gear 83    | −78  | +260 | Sun gear 82 |
| Pinions 80—80a | +26  | −52  | Pinions 81—81a |

The net output torque of the driven shaft 84 is then 260−78=182 units, its speed still being approximately ⅓ that of the driving shaft 10, and the efficiency of the transmission at this transition point will then be 182/3=60.67%.

In other words, as soon as the speed ratio between the second turbine and the first turbine exceeds 5/12 the frame 65 of the reaction assembly will be compelled to rotate forwardly because the overrunning clutch B prevents the first turbine member from rotating faster than the pump, and the second turbine will continue to increase in speed and eventually approach that of the first turbine.

Torque multiplication in the converter gradually decreases and will be unity when a speed ratio between the second turbine and pump of about .9 is reached. The torque pattern is then:

| Pinions 80—80a | −28 2/7 | +114 2/7 | Pinion 57   |
|----------------|---------|----------|-------------|
| Sun gear 83    | −42 6/7 | +142 6/7 | Sun gear 82 |
| Pinion 40      | +14 2/7 | −28 4/7  | Pinions 81—81a |

The net output torque of the driven shaft 84 is 142 6/7−42 6/7=100 units, which, of course, is equal to the engine torque. The gross input torque is 114 2/7 units impressed on pinion 57, while the pinion 40 feeds back only 14 2/7 units or torque.

Further increase in speed of the engine and vehicle will bring about the "direct drive" condition when the output or driven shaft 84 will rotate approximately at the speed of the drive shaft 10.

Assuming that in "direct drive" a speed ratio of .98 between the second turbine and pump is attained, i. e. a 2% slip in the converter prevails, then for one revolution of the drive shaft 10 the various assemblies make:

|   | Revolutions |
|---|---|
| 1. Driving assembly | 1 |
| 2. First turbine assembly | 1 |
| 3. Second turbine assembly | .980 |
| 4. Stator assembly | .960 |
| 5. Reaction assembly | .9657 |
| 6. Driven assembly | .9771 |

In "direct drive" ratio the efficiency of the transmission will be approximately 97.7% for a 2% slip condition in the converter.

C. Pick-up or second gear operation

When unusual driving conditions are encountered, such as quick passing of another vehicle in traffic or when descending a steep hill the transmission can be placed into "second gear" and kept there by shifting the valve 100 into the position shown in Figure 8. The piston 95a will be energized and as a result the brake band 92 will be applied to the frame 65 and thereby forward rotation of the frame will be halted. The second turbine member will be compelled to reduce its speed relative to the first turbine member.

In the construction of Figure 5 the ring piston 201 will be released, whereby the friction surfaces 209 become disengaged from the drive shaft 10 and the pinion 40 will be permitted to rotate faster than the drive shaft, this being accommodated by the overrunning clutch BB.

The speed of the driven shaft will be ⅘ the speed of the drive shaft 10, or a ratio of 1.25:1.

D. Reverse operation

For reverse operation of the transmission the valve 100 is shifted into the "reverse" position as shown in Figure 9. In this position the pistons 95 and 95a are not subjected to oil pressure and both brake bands 91 and 92 will be released. In Figure 5 the friction surfaces 209 will be de-clutched from the drive shaft 10 also.

Pressure oil, however, can now enter the cylinder 112 and force piston 113 with pawl 114 thereon into engagement with the teeth of the disc 55, thereby preventing the rotation of the second turbine assembly.

In accordance with the given gear data, when the pinion 57 is stationary, the driven shaft 84 will make ⅐ reverse revolution for one forward revolution of the drive shaft 10, however, its torque will be 7 to 14 times the engine torque, depending on the speed ratio between the first turbine member and the pump.

In the construction of Figure 5 the first turbine member will drive the piston 40 through the overrunning clutch BB.

The frame 65 will also turn in the reverse direction and it makes 5/7 reverse revolution for one forward revolution of the first turbine member.

The torque pattern at stall is then:

| Pinions 80—80a | −400 | +1600 | Pinion 57   |
|----------------|------|-------|-------------|
| Sun gear 83    | +600 | −2000 | Sun gear 82 |
| Pinion 40      | +200 | −400  | Pinions 81—81a |

The second turbine assembly will feel a backward torque of −100 units, consequently the net forward torque on disc 55 is 1600−100=1500 units at stall, when the engine torque is 100 units, and pinion 40 receives 200 units from the fluid torque converter.

E. Hill holder or no-roll-back

As long as the brake band 91 is in engagement with the brake wheel 89 the overrunning clutch F prevents the vehicle from rolling backwardly when it comes to a halt on an incline. This hill holding device is a great convenience to the operator when he again wishes to move forwardly. Dexterous manipulation of the foot or emergency brake and accelerator is thereby eliminated. When the transmission is set in "neutral" or "reverse" operation the frame 65 rotates reversely and at a higher speed than the driven shaft 84, therefore, the device F becomes automatically ineffective.

Both designs, illustrated in Figures 1 and 5, have now been described in detail and it will be obvious that various modifications, rearrangements and minor improvements will suggest themselves to those skilled in the art. For example, the pawl brake 114 can readily be replaced by a band brake, similar to bands 91 and 92.

It should further be understood that the gear proportions used in describing the invention are subject to considerable variation to accommodate various operating conditions and such modifications or rearrangements shall come within the scope of the following claims.

I claim:

1. A variable speed transmission comprising in combination, coaxial drive and driven shafts, a multiple element hydraulic torque converter and a planetary gear set interconnected with said torque converter, and having a pump element connected to said drive shaft, a first turbine element connected to a first sun gear of said planetary gear set, a second turbine element connected to a second sun gear of said planetary gear set and a stator element, a third and fourth sun gear integral with said driven shaft, a frame coaxial with said drive and driven shafts, first compound cluster pinion sets rotationally mounted in said frame and respectively meshing with said first and third sun gears, second compound cluster pinion sets rotationally mounted in said frame and respectively meshing with said second and fourth sun gears, stationary brake band means in cooperating relation with said frame, to cause said driven shaft to rotate at reduced speed in the same direction as the drive shaft but with increased torque when said stationary brake band means is applied to said frame.

2. A variable speed transmission comprising in combination, coaxial drive and driven shafts, a multiple element hydraulic torque converter driven by said drive shaft and a planetary gear set interconnected with said torque converter composed of a pump element connected to said drive shaft, a first turbine element connected to a first sun gear of said planetary gear set, a second turbine element connected to a second sun gear of said planetary gear set and a stator element, a third and fourth sun gear integral with said driven shaft, a frame coaxial with said drive and driven shafts, first compound cluster pinion sets rotationally mounted in said frame and respectively meshing with said first and third sun gears, second compound cluster sets rotationally mounted in said frame and respectively meshing with said second and fourth sun gears, one-way brake means connected to said frame, stationary brake band means in cooperating relation with said one-way brake means, to cause said driven shaft to rotate at reduced speed in the same direction as the drive shaft but with increased torque when said stationary brake band means is applied to said one-way brake means.

3. A variable speed transmission comprising in combination, coaxial drive and driven shafts, a multiple element hydraulic torque converter and a planetary gear set interconnected with said torque converter composed of a pump element connected to said drive shaft, a first turbine element connected to a first sun gear of said planetary gear set, a second turbine element connected to a second sun gear of said planetary gear set and a stator element with one-way brake means thereon, a third and a fourth sun gear integral with said driven shaft, a frame coaxial with said drive and driven shafts, first compound cluster pinion sets rotationally mounted in said frame and respectively meshing with said first and third sun gears, second compound cluster pinion sets rotationally mounted in said frame and respectively meshing with said second and fourth sun gears, one-way brake means connected to said frame, stationary brake band means in cooperating relation with said one-way brake means, to cause said driven shaft to rotate at reduced speed in the same direction as the drive shaft but with increased torque when said stationary brake band means is applied to said one-way brake means on said frame.

4. A variable speed transmission comprising in combination, coaxial drive and driven shafts, a multiple element hydraulic torque converter and a planetary gear set interconnected with said torque converter composed of a pump element connected to said drive shaft, a first turbine element connected to a first sun gear and a second turbine element connected to a second sun gear of said planetary gear set and a stator element with one-way brake means thereon, a third and fourth sun gear integral with the driven shaft, a frame coaxial with said drive and driven shafts, first compound cluster pinion sets rotationally mounted in said frame and respectively meshing with said first and third sun gears, second compound cluster pinion sets rotationally mounted in said frame and respectively meshing with said second and fourth sun gears, one-way brake means connected to said frame, stationary brake band means in cooperating relation with said one-way brake means, to cause said driven shaft in an initial phase to rotate at reduced speed in the same direction as said drive shaft but with increased torque when said stationary brake band means is applied to said one-way brake means connected to said frame, and one-way clutch means between said drive shaft and said first turbine element, to cause said driven shaft in a final phase to rotate at approximately the same speed and torque as the drive shaft.

5. A variable speed transmission comprising in combination, coaxial drive and driven shafts, a multiple element hydraulic torque converter and a planetary gear set interconnected with a torque converter, being composed of a pump element connected to said drive shaft, a first turbine element connected to a first sun gear and a second turbine element connected to a second sun gear of said planetary gear set and a stator element with one-way brake means thereon, a third and fourth sun gear integral with said driven shaft, a frame coaxial with said drive and driven shafts, a first compound cluster pinion rotationally mounted in said frame and respectively meshing with said first and third sun gears, a second compound cluster pinion rotationally mounted in said frame and respectively meshing with said second and fourth sun gears, means for braking said second turbine element and said second sun gear, said means comprising a member secured to said turbine element and stationary engaging means in cooperating relation with said member, and when said stationary engaging means is engaged with the member secured to said second turbine element said driven shaft will rotate in a direction opposite to that of said drive shaft, but at reduced speed and increased torque.

6. A variable speed transmission comprising in combination, coaxial drive and driven shafts, a multiple element hydraulic torque converter and a planetary gear set interconnected with said torque converter being composed of a pump element connected to said drive shaft, a first turbine element connected to a first sun gear and a second turbine element connected to a second sun gear of said planetary gear set and a stator element with one-way brake means thereon, a third and fourth sun gear integral with the driven shaft, a frame coaxial with said drive and driven shafts, a first compound cluster pinion rotationally mounted in said frame and respectively meshing with said first and third sun gears, a second compound cluster pinion rotationally mounted in said frame and respectively meshing with said second and fourth sun gears, one-way brake means connected to said frame, one-way clutch means between said drive shaft and said first turbine element, stationary brake band means in cooperating relation with said one-way brake means, and when applied thereto, said driven shaft will receive, in a first phase, multiplied torque from said first turbine element and its associated gearing only, in a second phase, multiplied torque will be transmitted to said driven shaft through said first and second turbine elements and their associated gearing, and, in a third phase, multiplied torque will be transmitted to said driven shaft through said second turbine element and its associated gearing only and feed-back torque will be transmitted to said drive shaft through both said associated gearing and said one-way clutch means, and, in a final phase, said torque converter operate as a fluid coupling and said driven shaft will receive the drive shaft torque only, while the feed-back torque transmission of said third phase continues.

7. A variable speed transmission comprising in combination, coaxial drive and driven shafts, a multiple element hydraulic torque converter and a planetary gear set interconnected with said torque converter being composed of a pump element connected to said drive shaft, a first turbine element connected to a first sun gear and a second turbine element connected to a second sun gear of said planetary gear set and a stator element with one-way brake means thereon, a third and fourth sun gear integral with the driven shaft, a frame coaxial with said drive and driven shafts, a first compound cluster pinion rotationally mounted in said frame and respectively meshing with said first and third sun gears, a second compound cluster pinion rotationally mounted in said frame and respectively meshing with said second and fourth sun gears, one-way brake means connected to said frame, a first one-way clutch means between said drive shaft and said first turbine element, a second one-way clutch means between said frame and said driven shaft, stationary brake band means in cooperating relation with said one-way brake means, and when applied thereto, said second one-way clutch will prevent said driven shaft from turning in a direction opposite to that of the drive shaft, while permitting forward rotation of said driven shaft.

8. A variable speed transmission comprising in combination, coaxial drive and driven shafts, a multiple element hydraulic torque converter and a planetary gear set interconnected with said torque converter, being composed of a pump element connected to said drive shaft, a first turbine element connected to a first sun gear, and a second turbine element connected to a second sun gear of said planetary gear set, and a stator element with one-way brake means thereon, a third and fourth sun gear integral with said driven shaft, a frame coaxial with said drive and driven shafts, a first compound cluster pinion rotationally mounted in said frame and respectively meshing with said first and third sun gears, a second compound cluster pinion rotationally mounted in said frame and respectively meshing with said second and fourth sun gears, means for braking said second turbine element and said second sun gear, said means comprising a member secured to said turbine element and stationary engaging means in cooperating relation with said member, one-way brake means connected to said frame, a first one-way clutch means between said drive shaft and said first turbine element, a second one-way clutch means between said frame and said driven shaft, stationary brake band means in cooperating relation with said one-way brake means, and when said brake band means is applied thereto said second one-way clutch will prevent reverse rotation of said driven shaft, and when said stationary brake band means is released and the stationary engaging means is engaged with the member secured to said second turbine element the driven shaft will rotate in the reverse direction at reduced speed but increased torque.

9. A variable speed transmission comprising in combination, coaxial drive and driven shafts, a multiple element hydraulic torque converter and a planetary gear set interconnected with said torque converter being composed of a pump element connected to said drive shaft, a first turbine element connected to a first sun gear, and a second turbine element connected to a second sun gear of said planetary gear set, and a stator element with one-way brake means thereon, a third and fourth sun gear integral with the driven shaft, a frame coaxial with said drive and driven shafts, a first compound cluster pinion rotationally mounted in said frame and respectively meshing with said first and third sun gears, a second compound cluster pinion rotationally mounted in said frame and respectively meshing with said second and fourth sun gears, one-way brake means connected to said frame, a first one-way clutch means between said drive shaft and said first turbine element, a second one-way clutch means between said frame and said driven shaft, a first stationary brake band means in cooperating relation with said one-way brake means, a second stationary brake band means in cooperating relation with said frame, and when said first stationary brake band means and/or said second stationary brake band means is applied, said second one-way clutch prevents reverse rotation but allows forward rotation of said driven shaft.

10. A variable speed transmission comprising in combination, coaxial drive and driven shafts, a multiple element hydraulic torque converter and a planetary gear set interconnected with said torque converter, being composed of a pump element connected to said drive shaft, a first turbine element connected to a first sun gear, and a second turbine element connected to a second sun gear of said planetary gear set, and a stator element with one-way brake means thereon, a third and fourth sun gear integral with said driven shaft, a frame coaxial with said drive shafts and said driven shaft, a first compound cluster pinion rotationally mounted in said frame and respectively meshing with said first and third sun gears, a second compound cluster pinion rotationally mounted in said frame and respectively meshing with said second and fourth sun gears, means for braking said second turbine element and said second sun gear, said means comprising a member secured to said turbine element and stationary engaging means in cooperating relation with said member, one-way brake means connected to said frame, a first one-way clutch means between said drive shaft and said first turbine element, a second one-way clutch means between said frame and said driven shaft, a first stationary brake band means in cooperating relation with said one-way brake means, a second stationary brake band means in cooperating relation with said frame, whereby said driven shaft rotates in the forward direction only when said first and/or second stationary brake band means is energized, and whereby said driven shaft rotates in the reverse direction when the stationary engaging means is engaged with the member secured to said second turbine element.

11. A variable speed transmission comprising in combination, coaxial drive and driven shafts, a multiple element hydraulic torque converter and planetary gearing interconnected with said torque converter, and having a pump element driven by said drive shaft, first and second turbine elements, a stator element with one-way brake means thereon, said four elements being bladed to form a closed chamber for circulating fluid, a frame coaxial with said drive and driven shafts, first and second countershafts rotationally mounted in said frame, an intermediate shaft, gear means connecting said intermediate shaft to said first countershaft, gear means connecting said second turbine to said second countershaft, and gear means connecting said countershafts to said driven shaft, first and second one-way clutch means operatively connected to said intermediate shaft, third clutch means for connecting said drive shaft to said first one-way clutch means, said second one-way clutch means being operatively connected to said first turbine element, a stationary brake band means in cooperating relation with said frame and when applied thereto and with said third clutch means released said driven shaft will operate in the low and intermediate speed ratio depending on the circulating velocity of the fluid in said converter.

12. A variable speed transmission comprising in combination, coaxial drive and driven shafts, a multiple element hydraulic torque converter and planetary gearing interconnected with said torque converter having a pump element driven by said drive shaft, first and second turbine elements, a stator element with one-way brake means thereon, said four elements being bladed to form a closed chamber for circulating fluid, a frame coaxial with said drive and driven shafts, first and second countershafts rotatably mounted in said frame, an intermediate shaft, gear means connecting said intermediate shaft to said first countershaft, gear means connecting said second turbine element to said second countershaft, and gear means connecting said countershafts to said driven shaft, first and second one-way clutch means operatively connected to said intermediate shaft, third clutch means for connecting said drive shaft to said first one-way clutch means, said second one-way clutch means being connected to said first turbine element, means for braking said second turbine element, said means comprising a member secured to said second turbine element and stationary engaging means in cooperating relation with said member, stationary brake means in cooperating relation with said frame, for forward and reverse rotation of said driven shaft when said stationary brake means is engaged with said frame, or said stationary engaging means is engaged with said member respectively.

13. A variable speed transmission comprising in combination, coaxial drive and driven shafts, a multiple element hydraulic torque converter and planetary gearing interconnected with said torque converter and having a pump element driven by said drive shaft, first and second turbine elements, a stator element with one-way brake means thereon, said four elements being bladed and form a closed chamber for circulating fluid, a frame coaxial with said drive and driven shafts, first and second countershafts rotatably mounted in said frame, an intermediate shaft, gear means connecting said intermediate shaft to said first countershaft, gear means connecting said second turbine to said second countershaft, and gear means connecting said countershafts to said driven shaft, first and second one-way clutch means operatively connected to said intermediate shaft, third clutch means for connecting said drive shaft to said first one-way clutch means, said second one-way clutch means being operatively connected to said first turbine element, one-way brake means connected to said frame, stationary brake band means in cooperating relation with said one-way brake means, and when applied thereto and with said third clutch means released said driven shaft will operate in the low and intermediate speed ratio depending on the circulating velocity of the fluid in the converter.

14. A variable speed transmission comprising in combination, coaxial drive and driven shafts, a multiple element hydraulic torque converter and planetary gearing interconnected with said torque converter and having a pump element driven by said drive shaft, first and second turbine elements, a stator element with one-way brake means thereon, said four elements being bladed and form a closed chamber for circulating fluid, a frame coaxial with said drive and driven shafts, first and second countershafts rotatably mounted in said frame, an intermediate shaft, gear means connecting said intermediate shaft to said first countershaft, gear means connecting said second turbine element to said second countershaft, and gear means connecting said countershafts to said driven shaft, first and second one-way clutch means operatively connected to said intermediate shaft, third clutch means for connecting said drive shaft to said first one-way clutch means, said second one-way clutch means being operatively connected to said first turbine element, means connected to said second turbine element, said means comprising a member secured to said second turbine element and stationary engaging means in cooperating relation with said member, one-way brake means connected to said frame, a second stationary brake means in cooperating relation with said one-way brake means, for forward and reverse rotation of said driven shaft when said stationary brake means is engaged with said frame, or said stationary engaging means is engaged with said member respectively.

15. A variable speed transmission comprising in combination, coaxial drive and driven shafts, a multiple element hydraulic torque converter and planetary gearing interconnected with said torque converter and having a pump element driven by said drive shaft, first and second turbine elements, a stator element with one-way brake means thereon, said four elements being bladed and form a closed chamber for circulating fluid, a frame coaxial with said drive and driven shafts, first and second countershafts rotatably mounted in said frame, an intermediate shaft, gear means connecting said intermediate shaft to said first countershaft, gear means connecting said second turbine element to said second countershaft, and gear means connecting said countershafts to said driven shaft, first and second one-way clutch means operatively connected to said intermediate shaft, a third one-way clutch means between said frame and said driven shaft, a fourth, hydraulically operated, clutch means for connecting said drive shaft to said first one-way clutch means, said second one-way clutch means being connected to said first turbine element, means for braking said second turbine element, said means comprising a toothed member secured to said second turbine and stationary pawl engaging means in cooperating relation with said member, one-way brake means connected to said frame, a second stationary brake means in cooperating relation with said one-way brake means, said third one-way clutch means preventing reverse rotation of said driven shaft when said second stationary brake means is applied to said one-way brake means, while permitting reverse rotation of said driven shaft when said pawl engaging means is engaged with said toothed member connected to said second turbine element.

16. In a power transmitting mechanism, an input shaft, an output shaft, a gear unit interconnected with said torque converter, and having a pump driven by said input shaft, a pair of torque transmitting turbines, a stator with one-way brake means thereon, said pump, turbines and stator forming a toroidal chamber for a circulating fluid, a first gear driven by the first of said turbines, a second gear driven by the second of said turbines, a frame coaxial with said input and output shafts, a duplex gear connected to said output shaft, a first compound cluster pinion rotatably mounted in said frame and meshing with said first gear and one of said duplex gears, a second compound cluster pinion rotatably mounted in said frame and meshing with said second gear and the other of said duplex gears, one-way clutch means between said first turbine and said input shaft, one-way brake means connected to said frame, stationary brake means in cooperating relation with said one-way brake means, and when said stationary brake means engages said one-way brake means, the velocity of the circulating fluid imposes in its initial operating phase a multiplied forward torque on said first turbine and a reverse torque on said second turbine, said torques being further augmented by said interconnected gearing and thereby resulting in a net multiplied forward torque on said output shaft, the forward torque delivered by said first turbine gradually diminishing in a second phase of operation while the torque delivered by said second turbine changes from reverse to forward, and in a final operating phase said second turbine alone transmitting forward torque to said second gear of said interconnected gearing through which the larger portion of said torque is delivered to said output shaft while the smaller portion of said torque is returned through said first gear and one-way clutch means to said input shaft and compelling the four components of said torque converter and the elements of said interconnected gearing to rotate at substantially the speed of said input shaft.

17. In a power transmitting mechanism, an input shaft, an intermediate shaft, an output shaft, a fluid torque converter and gearing interconnected with said shafts and converter, said converter having a pump driven by said input shaft, a pair of torque transmitting turbines and a stator with one-way brake means thereon, said pump, turbines and stator forming a toroidal chamber for a circulating fluid, first and second one-way clutch means drivingly connecting said intermediate shaft to the first of said turbines and to a hydraulically actuated clutch means operatively associated with said input shaft, a first gear connected to said intermediate shaft, a second gear driven by the second of said turbines, a frame coaxial with said input and output shafts, a duplex gear connected to said output shaft, a first compound cluster pinion rotatably mounted in said frame and meshing with said first gear and one of said duplex gears, a second compound cluster pinion rotatably mounted in said frame and meshing with said second gear and the other of said duplex gears, one-way brake means connected to said frame, stationary brake means in cooperating relation with said one-way brake means, and with said stationary brake means engaged with said one-way brake means and with said hydraulically actuated clutch means energized the power transmitting mechanism will pass through three operating phases, a first operating phase being characterized by the transmittal of multiplied forward torque by the first turbine and of reverse torque by the second turbine, said torques being further augmented by said interconnected gearing and thereby resulting in the transmittal of a net multiplied forward torque to said output shaft, a second operating phase being characterized by a gradual diminishing of forward torque transmitted by said first turbine and the initiation of forward torque transmitted by said second turbine, and a third operating phase being characterized by the transmittal of maximum torque by said second turbine to said second gear, frame and output shaft, and the transmittal of forward torque to the input shaft by said first turbine, but when the hydraulically actuated clutch means is deenergized the power transmitting mechanism will not pass into the third operating phase, the output shaft will receive multiplied torque and the torque converter will operate as a fluid coupling.

18. In a power transmitting mechanism according to claim 16, in which means for braking said second turbine is provided, said means comprising a member secured to said second turbine and stationary engaging means in cooperating relation with said member.

19. In a power transmitting mechanism according to claim 17, in which means for braking said second turbine is provided, said means comprising a toothed member secured to said second turbine and stationary pawl engaging means in cooperating relation with said member, for reverse operation of the power transmitting mechanism.

20. In a power transmitting mechanism according to claim 17, in which a one-way clutch connects said frame and said output shaft, to prevent reverse rotation of said output shaft when said stationary brake means is engaged with said one-way brake means.

References Cited in the file of this patent

UNITED STATES PATENTS

| | | |
|---|---|---|
| 2,371,574 | Swennes | Mar. 13, 1945 |
| 2,595,969 | McFarland | May 6, 1952 |
| 2,682,177 | Kelbel | June 29, 1954 |

FOREIGN PATENTS

| | | |
|---|---|---|
| 666,092 | Great Britain | Feb. 6, 1952 |